United States Patent [19]

Baron

[11] Patent Number: 5,329,720

[45] Date of Patent: Jul. 19, 1994

[54] ENHANCED FISHING LURE

[75] Inventor: Richard D. Baron, Zephyrhills, Fla.

[73] Assignee: Wanabe Outdoors, Inc., Tampa, Fla.

[21] Appl. No.: 2,188

[22] Filed: Jan. 8, 1993

Related U.S. Application Data

[63] Continuation-in-part of Ser. No. 890,811, Jun. 1, 1992, Pat. No. 5,177,895.

[51] Int. Cl.$^5$ ............................................. A01K 83/06
[52] U.S. Cl. ........................................ 43/44.2; 43/44.6
[58] Field of Search ................... 43/44.2, 44.6, 44.4, 43/44.8, 42.4, 42.41, 42.42, 42.43, 42.24

[56] References Cited

U.S. PATENT DOCUMENTS

| | | | |
|---|---|---|---|
| 1,615,803 | 1/1927 | Pflueger | 43/42.4 |
| 2,467,971 | 4/1949 | Frair | 43/44.2 |
| 2,763,086 | 9/1956 | Johnson et al. | 43/44.2 |
| 3,445,953 | 5/1969 | Dailey | 43/42.42 |
| 3,543,434 | 12/1970 | Hauck | 43/44.6 |
| 4,796,376 | 1/1989 | Schlaegel | 43/44.6 |
| 4,848,023 | 7/1989 | Ryder et al. | 43/44.6 |
| 5,177,895 | 1/1993 | Baron | 43/44.2 |

Primary Examiner—Paula A. Bradley
Assistant Examiner—Chuck Y. Mah
Attorney, Agent, or Firm—Frijouf, Rust & Pyle

[57] ABSTRACT

An enhanced fishing lure is disclosed for attaching a bait to a fishing line, comprising a lure head having a front aperture for enabling the fishing line to extend therethrough. The lure head has an insert cavity communicating with the front aperture. A lure insert comprises an insert portion with a first and a second panel extending from the lure head and the lure insert, respectively. At least one locking pin is secured to one of the first and second first and second panels for cooperating with at least one locking aperture defined in the other of the first and second panels. A restrainer is secured to the lure insert for restraining the movement of the fishing line relative thereto. The locking pin extends through the bait for restraining the movement of the bait relative thereto. The lure insert is insertable within the insert cavity of the lure head with the fishing line extending through the front aperture of the lure head and with the locking aperture cooperating with the locking pin for interlocking the lure insert to the lure head.

28 Claims, 13 Drawing Sheets

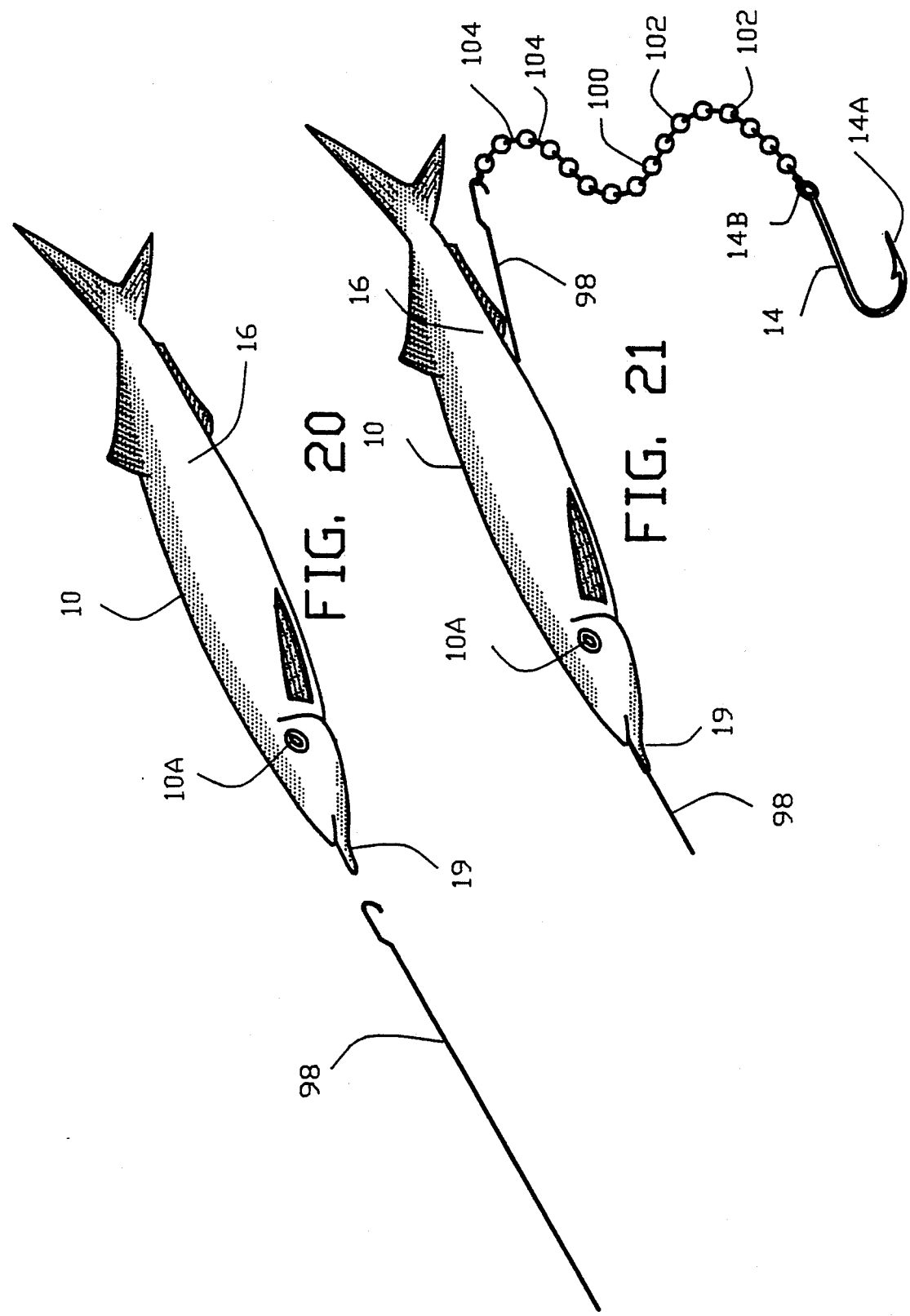

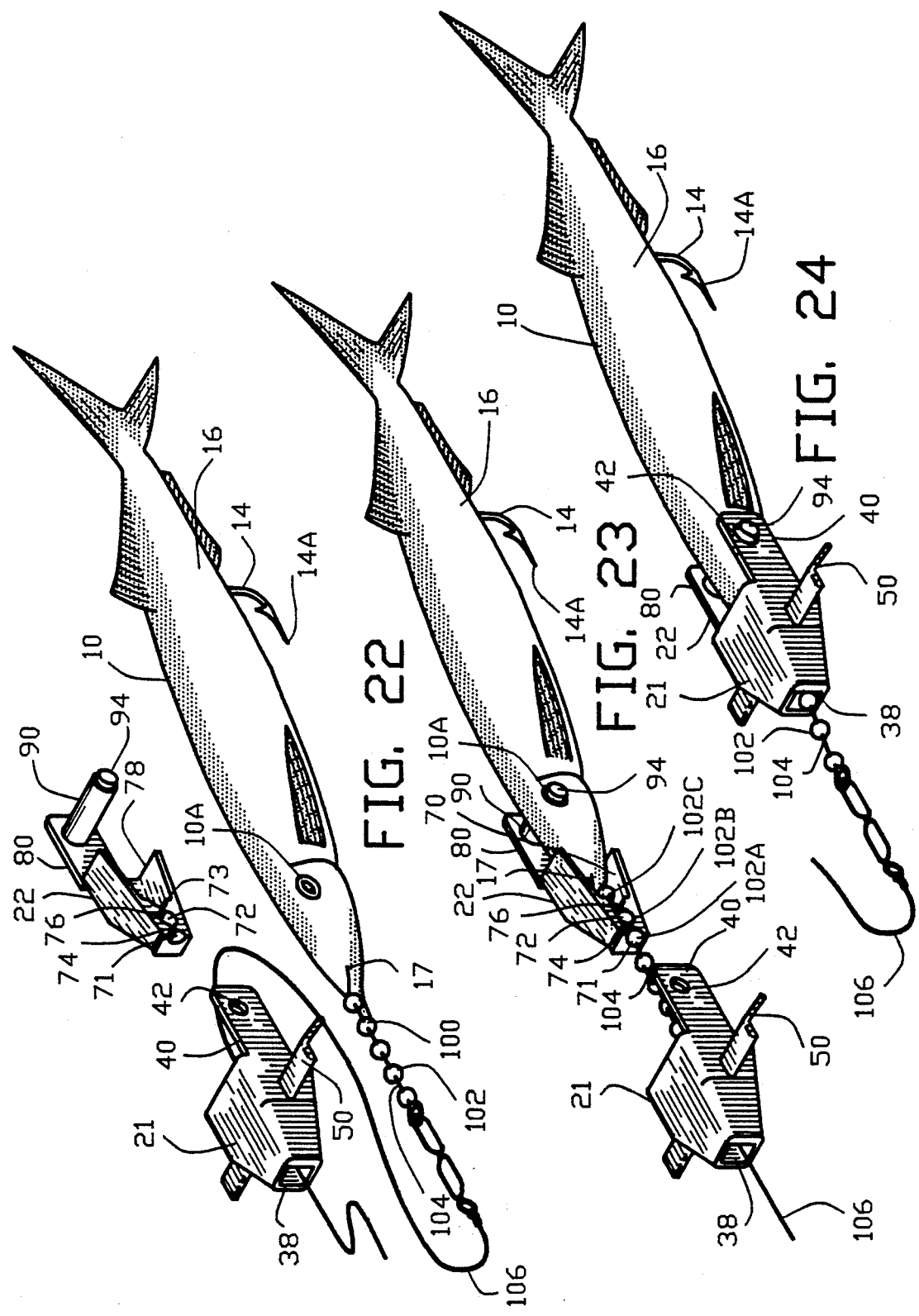

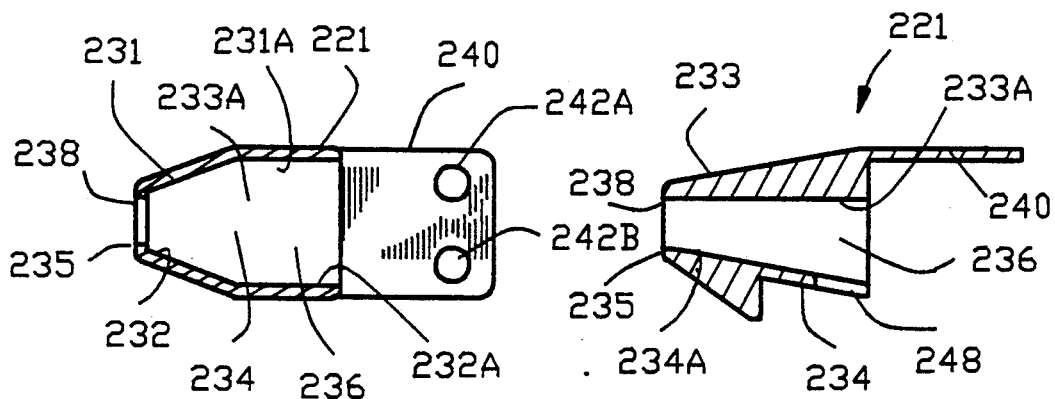
FIG. 30  FIG. 31
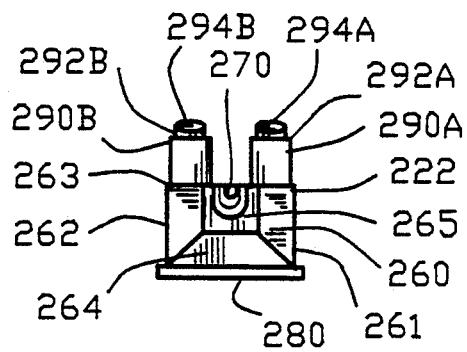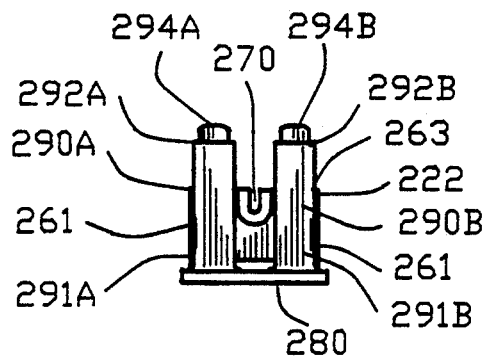
FIG. 32  FIG. 33
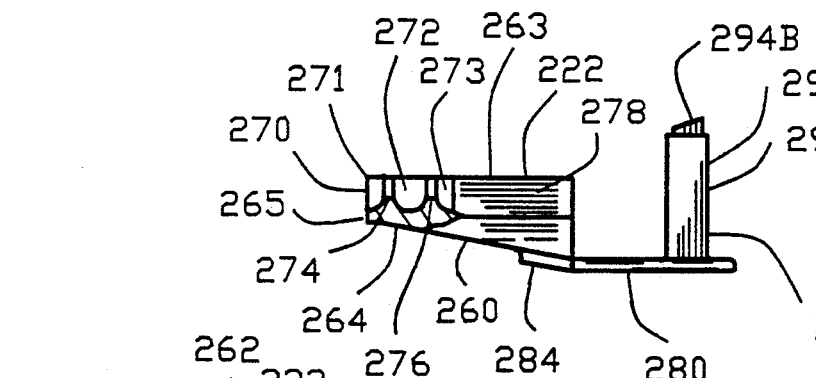
FIG. 34
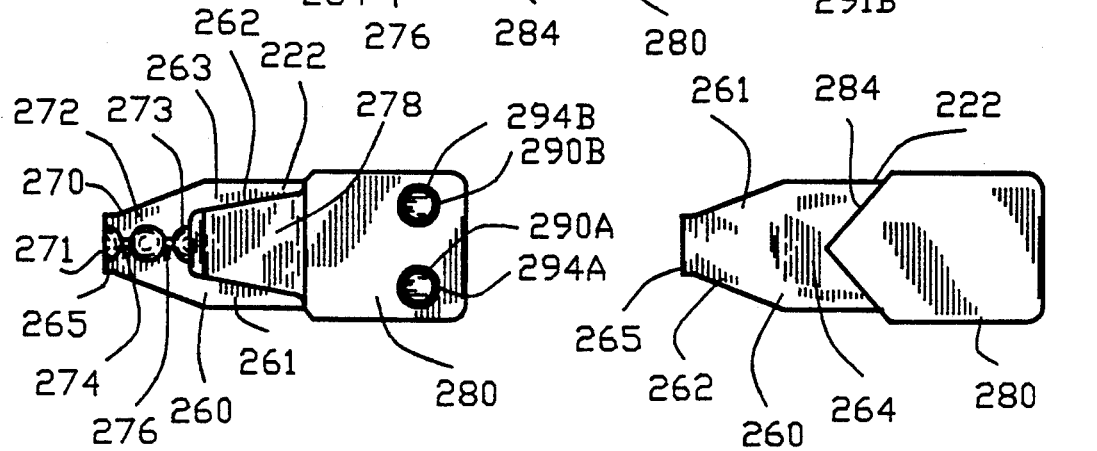
FIG. 35  FIG. 36

1

ENHANCED FISHING LURE

CROSS-REFERENCE TO RELATED APPLICATIONS

This is a continuation-in-part of United States Patent application Ser. No. 890,811 filed Jun. 1, 1992 now U.S. Pat. No. 5,177,895. All subject matter set forth in application Ser. No. 890,811 is hereby incorporated by reference into the present application as if fully set forth herein.

BACKGROUND OF THE INVENTION

1. Field of the Invention

This invention relates to fishing and more particularly to an improved fishing lure for use with natural or artificial bait.

2. Background of the Invention

Various types of fishing lures have been provided by the prior art to sports fishermen. In general, fishing lures may be classified as artificial bait fishing lures and natural bait fishing lures. In an artificial bait fishing lure, the fishing lure provides the total attraction for a fish and simulates the motion, action, sound and appearance of a natural bait. In a natural bait fishing lure, the fishing lure enhances the motion, action, sound and appearance of a natural bait. In the event that the natural bait is dead, the natural bait fishing lure again provides the motion, action and sound of the natural bait in a manner similar to the artificial bait fishing lure.

U.S. Pat. No. 2,017,333 to Zuck discloses a lure with live bait impaling means by which the bait is retained on the lure to permit casting or trolling.

U.S. Pat. No. 2,196,376 to Anderson discloses a means which may be manually gripped for easily inserting an impaling member into the bait, such as a minnow or other small fish.

U.S. Pat. No. 2,848,836 to Dodd discloses a bait harness that is adapted to facilitate connection and disconnection of the bait to a harness.

U.S. Pat. No. 3,415,004 to Whalen discloses a live bait harness having a band embracing the body of the live bait comprising two one-piece wire mechanisms one of which is fastened to a band and the other of which is a spreader mechanism for holding a pair of fishhooks spaced apart on opposite sides of the live bait.

U.S. Pat. No. 3,645,031 to Egles discloses a trolling rig for bait fishing having a substantially frustoconical-shaped cap to receive the head of the bait fish. A fish locking pin extends through the openings and the head of the fish for securing the fish to the cap.

U.S. Pat. No. 4,067,135 to Martin discloses a fishing lure adapted to hold live, dead and artificial bait and includes a cup having an open end and a closed end for holding a first portion of a bait therein. Anchors extend from the open end of the cup into a portion of the bait.

U.S. Pat. No. 4,133,132 to Ellis et al discloses a protector for covering the front face of a "plug-cut herring" to maintain the front face of the plug at a predetermined angle. The protector is a cap having a planar face and a cylindrical wall adapted to extend rearwardly along the sides of the herring when the inside surface of the cap member abuts the front face of the herring.

U.S. Pat. No. 4,233,771 to Robinson discloses a bait holding minnow-type bait having a ring within which the head of the bait has a wedged fit and which is held in position by engagement of a pair of hooks at free ends of a pair of parallel arms extending aft from the ring.

U.S. Pat. No. 4,791,751 to Francklyn discloses an adjustable bait-receiving fishing lure for use in receiving baits. The bait-receiving lure includes a top section and bottom section that cooperatively engage the upper and lower forward portions of a bait.

U.S. Pat. No. 4,848,023 to Ryder et al discloses a fishing lure for use with dead bait fish including a cover having a cavity having projecting barbs for insertion of the head of the bait fish. The cover can be opened to received the head of the bait fish and can be closed to anchor the fish head within the articulated cover.

U.S. Pat. No. 4,932,154 to Andreetti discloses a trolling rig intended for use with ballyhoo. The trolling rig has a conical cap that resembles the head of a ballyhoo with a leader being attached to the leading edge of the cap. A second leader is attached to a rear lower edge of the conical cap and a hook is connected thereto.

In my prior U.S. Pat. No. 5,177,895, I disclosed an improved fishing lure for attaching a bait to a fishing line that overcame the difficulties encountered by the prior art. It is a primary object of this invention to further improve upon my prior U.S. Pat. No. 5,177,595 by providing an enhanced fishing lure capable of being used with a wide variety of natural and artificial baits.

Another object of this invention is to provide an enhanced fishing lure for attaching a bait to a fishing line wherein locking pins extends through an orifice in an artificial bait.

Another object of this invention is to provide an enhanced fishing lure for attaching a bait to a fishing line that permits the rapid addition of bait or the rapid removal of bait from the fishing lure.

Another object of this invention is to provide an enhanced fishing lure for attaching a bait to a fishing line that may be specifically adapted for artificial bait or the like.

Another object of this invention is to provide an enhanced fishing lure for attaching of a bait to a fishing line that permits the adjusting the position of a hook disposed at a termination end of the fishing line relative to the bait.

Another object of this invention is to provide an enhanced fishing lure for attaching a bait to a fishing line including fin means for stabilizing the movement of the fish lure through the water without undesirable spinning.

Another object of this invention is to provide an enhanced fishing lure for attaching a bait to a fishing line that is substantially weedless.

Another object of this invention is to provide an enhanced fishing lure for attaching a bait to a fishing line that increases the action of the bait as well as the visibility of the bait within the water.

Another object of this invention is to provide an enhanced fishing lure for attaching a bait to a fishing line having an action plate for providing improved action for the fishing lure.

Another object of this invention is to provide an enhanced fishing lure for attaching a bait to a fishing line having an action plate for enabling the fishing lure to be skipped over weed beads.

Another object of this invention is to provide an enhanced fishing lure for attaching a bait to a fishing line having an action plate for providing an enhanced acoustical output of the fishing lure.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention an enhanced fishing lure for attaching a bait to a fishing line, comprising a lure head having a front aperture for enabling the fishing line to extend therethrough. The lure head has an insert cavity communicating with the front aperture. A lure insert comprises an insert portion with a first and a second panel extending from the lure head and the lure insert, respectively. Locking pin means is secured to one of the first and second panels for cooperating with locking aperture means defined in the other of the first and second panels. Restraining means is secured to the lure insert for restraining the movement of the fishing line relative thereto. The locking pin means extends through the bait for restraining the movement of the bait relative thereto. The lure insert is insertable within the insert cavity of the lure head with the fishing line extending through the front aperture of the lure head and with the locking aperture means cooperating with the locking pin means for interlocking the lure insert to the lure head.

The locking pin means extends through the bait and is partially received within the locking aperture means for restraining the movement of the bait relative thereto. Preferably, at least one of the first and second panels being resilient for enabling the introduction and removal of the locking pin means within the locking aperture means to permit the addition and removal of the bait from the fishing lure. The insert cavity is defined for slidably receiving the insert portion of the lure insert therein.

In one embodiment, the first panel extends from a first side surface of the lure head and the second panel is aligned with a second side surface of the lure head. In another embodiment of the invention, the first panel extends from one of the top and bottom of the lure head and the second panel is aligned with the other the top and bottom of the lure head. A relief is defined in at least one of the lure head and the lure insert for receiving a head portion of the bait or for receiving a snap for affixing a fishing hook to the fishing line.

The restraining means comprises means for adjusting the position of a hook disposed at a termination end of the fishing line relative to the bait. Preferably, the restraining means includes a slot extending through the lure insert for enabling the fishing line to extend therethrough with means for restricting the movement of the fishing line relative to the slot.

In one embodiment of the invention, the fishing line includes a bead leader comprising a plurality of beads interconnected by a plurality of interconnecting wires. The restraining means includes a slot extending through the lure insert for enabling the interconnecting wires to extend therethrough. A plurality of depressions are defined in the lure insert along the slot for receiving the plurality of beads therein to restrict the movement of the bead leader relative to the slot.

Preferably, the lure head comprises a tapered front portion disposed about the front aperture for facilitating the movement of the fishing lure through the water. Fin means extend from the lure head for stabilizing the movement of the fish lure through the water. An optional action plate extends from the lure head for enabling the fishing lure to be skipped over weed beads. The action plate provides an enhanced acoustical output of the fishing lure.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 20 is a first step of securing the improved fishing lure of FIGS. 3-13 to a bait fish illustrating the insertion of a retrieving catch through the bait fish;

FIG. 21 is a second step of securing the improved fishing lure of FIGS. 3-13 to the bait fish illustrating the coupling of the retrieving catch with a bead leader having a fishing hook;

FIG. 22 is a third step of securing the improved fishing lure of FIGS. 3-13 to the bait fish illustrating the drawing of the bead leader through the bait fish and the passing of the bead leader through a front aperture in the improved fishing lure;

FIG. 23 is a fourth step of securing the improved fishing lure of FIGS. 3-13 to the bait fish illustrating the impaling of the bait fish by the improved fishing lure;

FIG. 24 is a fifth step of securing the improved fishing lure of FIGS. 3-13 to the bait fish illustrating the assembly of the improved fishing lure for affixing of the improved fishing lure to the bead leader;

FIG. 30 is a sectional view along line 30—30 in FIG. 28;

FIG. 31 is a sectional view along line 31—31 in FIG. 26;

FIG. 32 is a front elevational view of the lure insert of FIG. 25;

FIG. 33 is a rear elevational view of the lure insert of FIG. 25;

FIG. 34 is a right side view partially in section of FIG. 32;

FIG. 35 is a top view of FIG. 34;

FIG. 36 is a bottom view of FIG. 35;

Similar reference characters refer to similar parts throughout the several Figures of the drawings.

DETAILED DISCUSSION

Figure 1:
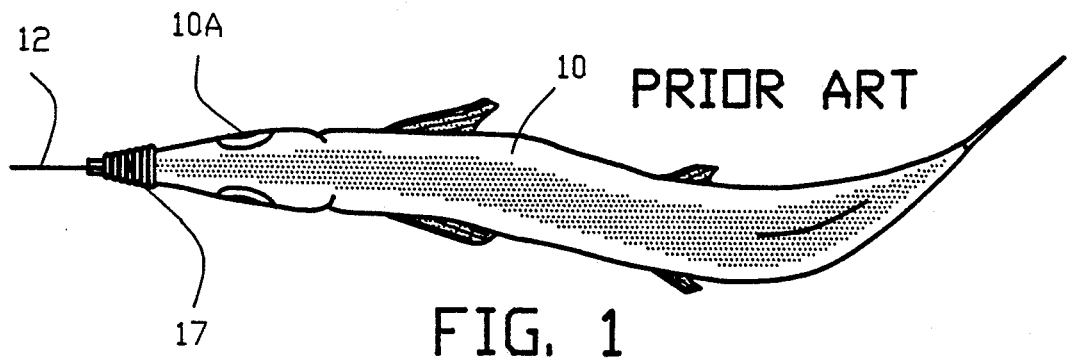
FIG. 1 is a top view of a bait fish secured to a conventional wire leader using a prior art system.
Figure 2:
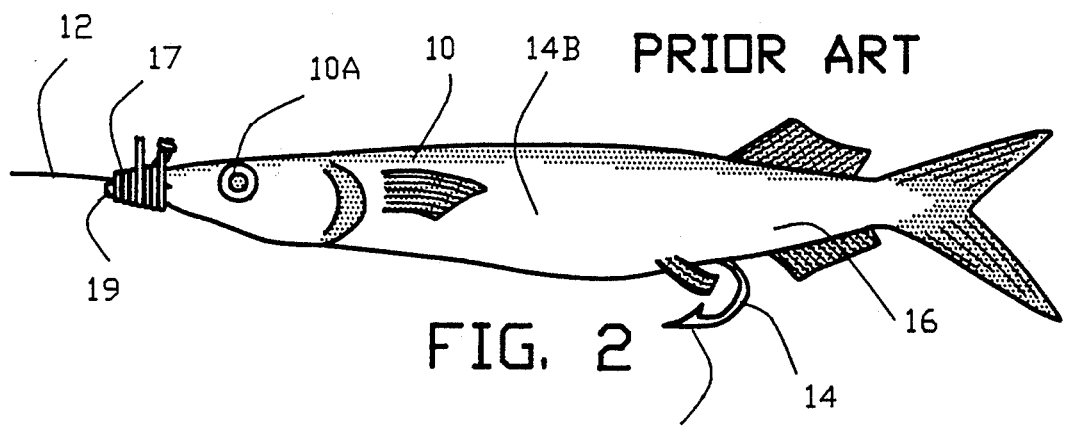
FIG. 2 is a side view of FIG. 1.

FIGS. 1 and 2 illustrate top and side views of a bait fish 10 secured to a conventional wire leader 12 using a prior art system. In this example, the bait fish 10 is shown as a ballyhoo or balao weighing between one-quarter pound and one-half pound. This prior art system is widely used for securing the ballyhoo or other bait fish 10 to the wire leader 12 for trolling for smaller predator fish as well as large game fish such as marlin, sailfish and the like.

FIGS. 1 and 2 illustrate a fishing hook 14 inserted through the bait fish 10 with a point 14A of the fishing hook 14 extending from a posterior portion 16 of the bait fish 10. An eye 14B (not shown) of the fishing hook 14 is connected to the wire leader 12. A securing wire 17 is fastened to the eye 14B (not shown) of the fishing hook 14 and is wrapped around the bait fish 10 for securing the bait fish 10 to the wire leader 12.

Although the prior art system shown in FIGS. 1 and 2 is widely used for trolling bait fish 10, the prior art has developed other varied methods of securing a bait fish 10 to a wire leader 12. Examples of the other different and distinct methods for securing the bait fish 10 to the wire leader 12 are disclosed in numerous fishing publications.

Figure 3:
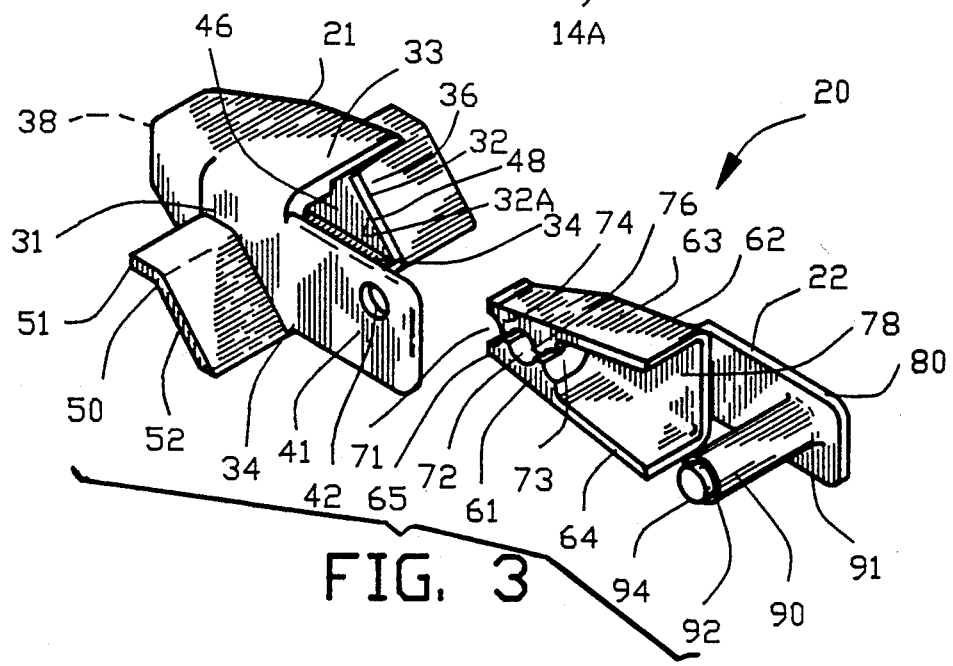
FIG. 3 is an isometric view of a first embodiment of an improved fishing lure comprising a lure head and a lure insert incorporating the present invention.
Figure 4:
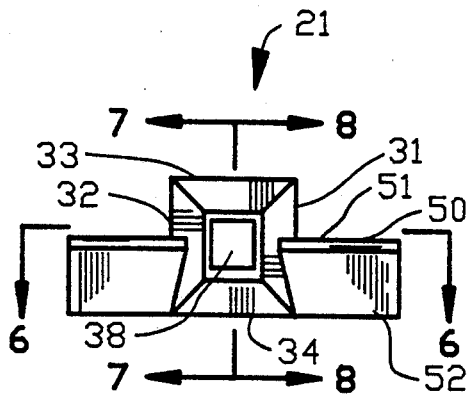
FIG. 4 is a front elevational view of the lure head of FIG. 3.

FIG. 3 is an isometric disassembled view of a first embodiment of an improved fishing lure 20 having a lure head 21 and a lure insert 22. FIGS. 4-8 illustrate various views of the lure head 21. The lure head 21 comprises a generally truncated pyramidal shape defined by a first and a second head sidewall 31 and 32 and a top head wall 33 and a bottom head wall 34. The generally truncated pyramidal shape provides a tapered front portion for facilitating the movement of the improved fish lure 20 through the water. The first and second head sidewalls 32 and the top and bottom head walls 33 and 34 have first and second head interior surfaces 31A and 32A and top and bottom head interior surfaces 33A and 34A defining an insert cavity 36 within the lure head 21. A front aperture 38 in the lure head 21 communicates with the insert cavity 36.

The first head sidewall 31 includes a rearwardly extending first panel 40 having a locking aperture 42 defined therein. An optional first eye indicia (not shown) may be disposed about the locking aperture 42 for simulating an eye of the bait fish 10. The first head sidewall 31 is substantially thicker than the second head sidewall 32 and the top and bottom head walls 33 and 34. A generally U-shape head relief 46 is defined in the first head sidewall 31 whereas a generally V-shaped cut-out 48 is defined in the second head sidewall 32.

Preferably, the lure head 21 includes a stabilizing fin 50 having a front fin portion 51 and a rear fin portion 52. The front fin portion 51 is established to be substantially horizontal to the direction of movement of the lure head 21 when the lure head 21 is pulled through the water. The rear fin portion 52 is angled downwardly for providing stabilization to the improved fishing lure 20 during trolling.

FIGS. 9-13 illustrate various views of the lure insert 22. The lure insert 22 comprises a partially pyramidal shaped insert portion 60 having a first and a second insert sidewall 61 and 62 and a top insert wall 63 and a bottom insert wall 64. The first and second insert sidewall 62 and the top and bottom insert walls 63 and 64 are established at an angle for closely engaging the first and second head sidewalls 31 and 32 and the top and bottom head walls 33 and 34, respectively, of the lure head 21 when the lure insert 22 is fully disposed within the insert cavity 36. The first insert sidewall 61 includes an insert slot 70 extending from a front insert wall 65 of the lure insert 22 to an insert relief 78 defined in the first insert sidewall 61. A plurality of depressions including a first, second and a third depression 71-73 are intermittently defined in the first insert sidewall 61 with a first separating wall 74 interposed between the first and the second depressions 71 and 72 and with a second separating wall 76 interposed between the second and the third depressions 72 and 73. The first, second and the third depressions 71-73 and the first and second separating walls 74 and 76 comprise a restraining means for restraining the movement of a leader relative to the improved fishing lure 20 as will be described in greater detail hereinafter.

The second insert sidewall 62 comprises a second panel 80 having a generally V-shaped projection 82 for matingly engaging with the V-shaped cut-out 48 of the second head sidewall 32 when the lure insert 22 is disposed within the lure head 21. A locking pin 90 having a proximal and distal end 92 has the proximal end 91 thereof secured to the second panel 80. The distal end 92 of the locking pin 90 includes a locking portion 94 having a reduced diameter for insertion within the locking aperture 42 of the first panel 40 when the lure insert 22 is disposed within the lure head 21. An optional second eye indicia (not shown) may be disposed about the locking pin 90 for simulating an eye of the bait fish 10.

Preferably, the lure head 21 and the lure insert 22 are each formed as a unitary member of a molded polymeric material. The first and second panels 40 and 80 are slightly flexible for enabling the locking portion 94 to be inserted and removed from the locking aperture 42 by deflecting either the first and/or the second panels 40 and 80.

Figure 5:
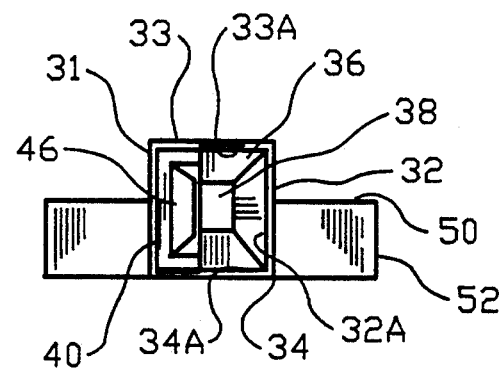
FIG. 5 is a rear elevational view of the lure head of FIG. 3.
Figure 6:
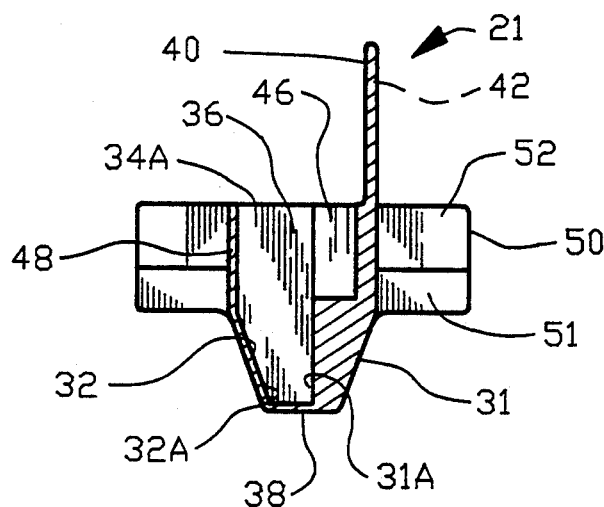
FIG. 6 is a sectional view along line 6—6 in FIG. 4.
Figure 7:
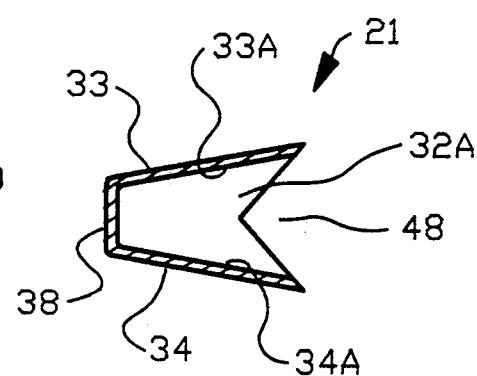
FIG. 7 is a sectional view along line 7—7 in FIG. 4.
Figure 8:
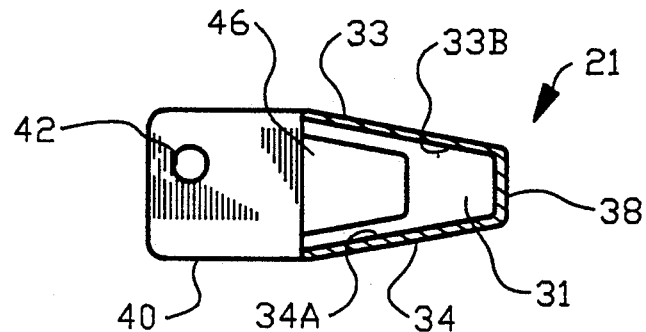
FIG. 8 is a sectional view along line 8—8 in FIG. 4.
Figure 9:
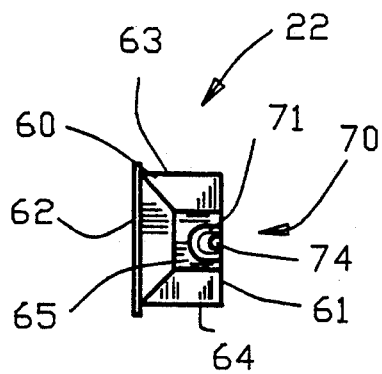
FIG. 9 is a front elevational view of the lure insert of FIG. 3.
Figure 10:
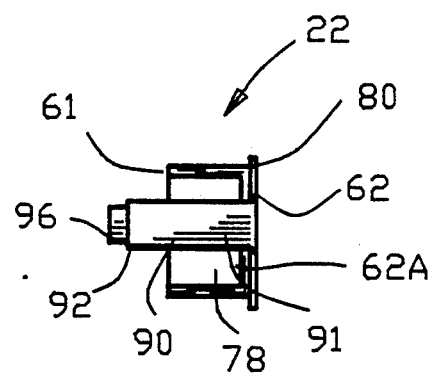
FIG. 10 is a rear elevational view of the lure insert of FIG. 3.
Figure 11:
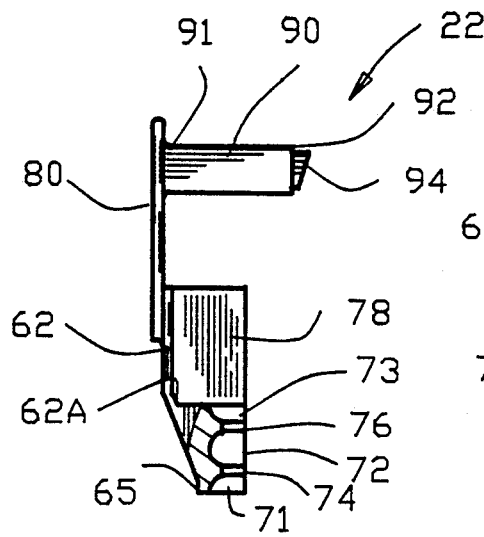
FIG. 11 is a top view partially in section of FIG. 9.
Figure 12:
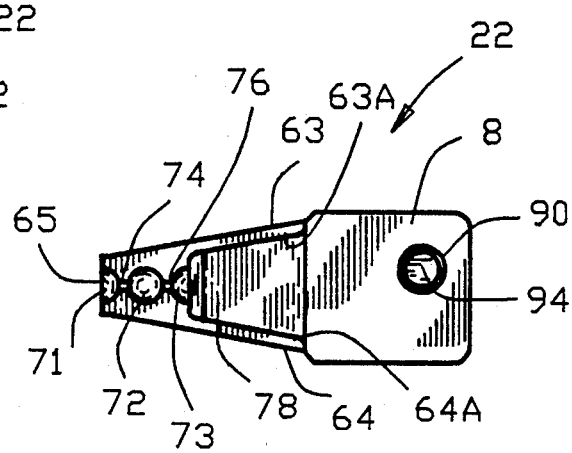
FIG. 12 is a right side view of FIG. 9.
Figure 13:
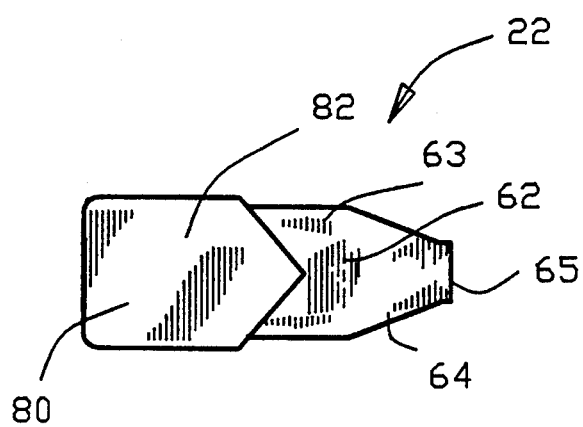
FIG. 13 is a left side view of FIG. 9.
Figure 14:
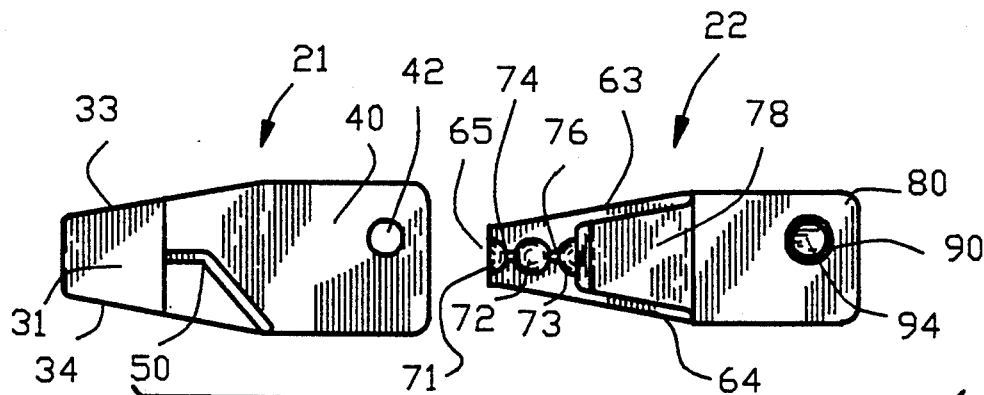
FIG. 14 is a side elevational of the improved fishing lure of FIG. 3 with the improved fishing lure being in an unassembled condition.
Figure 15:
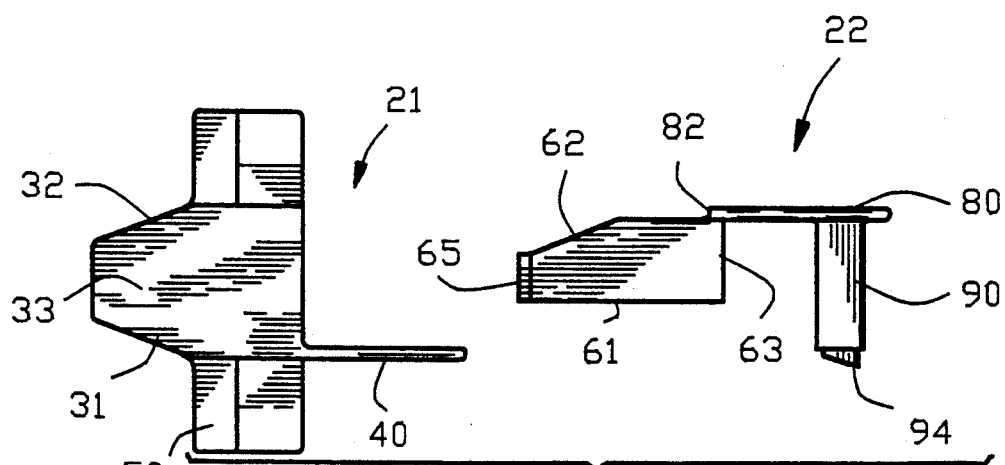
FIG. 15 is a top view of FIG. 14.

FIG. 14 is a side view of the lure head 21 and the lure insert 22 being in an unassembled position. FIG. 5 is a top view of FIG. 14 illustrating the relative positions of the first and second panels 40 and 80 and the locking pin 90.

Figure 16:
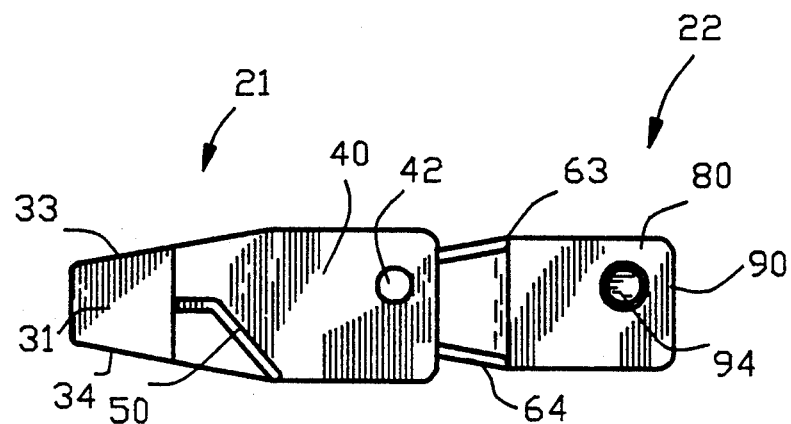
FIG. 16 is a side elevational similar to FIG. 14 with the improved fishing lure being in a partially assembled condition.
Figure 17:
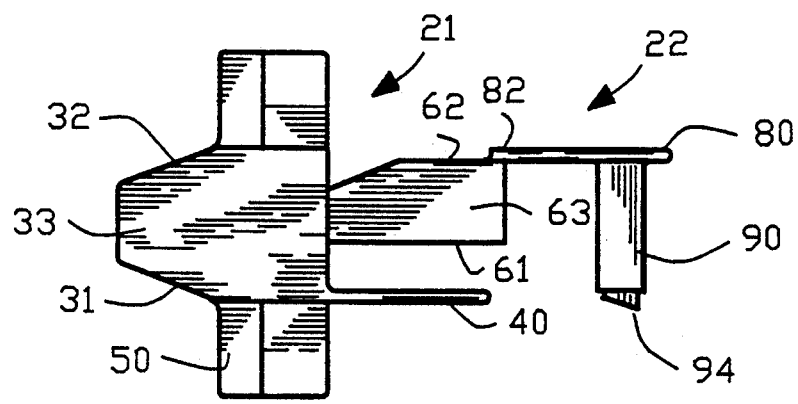
FIG. 17 is a top view of FIG. 16.

FIG. 16 is a side view similar to FIG. 14 illustrating the lure insert 22 being partially disposed within the internal cavity of the lure head 21. FIG. 17 is a top view of FIG. 16. The insert portion 60 of the lure insert 22 is slidably received within the insert cavity 36 of the lure head 21.

Figure 18:
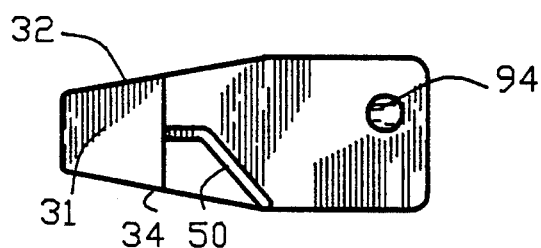
FIG. 18 is a side elevational view similar to FIG. 14 with the improved fishing lure being in an assembled condition.
Figure 19:
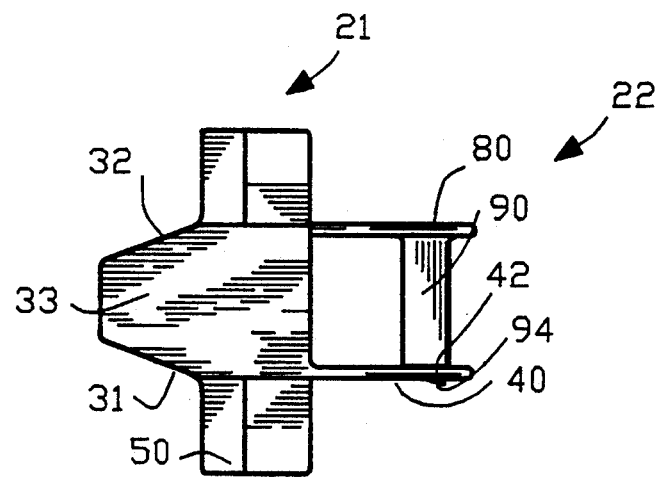
FIG. 19 is a top view of FIG. 18.

FIG. 18 is a side view similar to FIG. 14 illustrating the complete insertion of the lure insert 22 within the lure head 21 and with the lock portion of the locking pin 90 being received within the locking aperture 42 of the first panel 40. FIG. 19 is a top view of FIG. 18. Engagement of the locking portion 94 within the locking aperture 42 of the first panel 40 interlocks the lure insert 22 within the lure head 21. It should be appreciated by those skilled in the art that the insertion of the locking portion 94 within the locking aperture 42 of the first panel 40 has been accomplished by an outward deflection of FIG. 19 of either the first and/or the second panel 40 and 80.

FIG. 20 illustrates a first step of securing the improved fishing lure 20 to the bait fish 10. A retrieving catch 98 is inserted into the mouth of the bait fish 10 and forced through the bait fish 10 to exit from the posterior portion 16.

FIG. 21 illustrates a second step of securing the improved fishing lure 20 to the bait fish 10 wherein the retrieving catch 98 is coupled to a bead 100 having a fishing hook 14. The bead leader 100 is of conventional design having a plurality of beads 102 interconnected by a plurality of interconnecting wires 104.

FIG. 22 illustrates a third step of securing the improved fishing lure 20 to the bait fish 10. The bead leader 100 is drawn through the bait fish 10 by withdrawing the retrieving catch 98. The retrieving catch 98 is withdrawn from the bait fish 10 to position the point 14A of the hook 14 in the desired location. A fishing line 106 is passed through the front aperture 38 of the lure head 21 and is secured to the bead leader 100. In the alternative, the hook 14 may be rotated one hundred and eighty degrees in FIG. 22 such that the point 14A of the hook 14 is embedded in the bait fish 10. When the hook 14 is embedded in the bait fish 10, the bait is substantially weedless.

FIG. 23 illustrates a fourth step of securing the improved fishing lure 20 to the bait fish 10. The locking pin 90 is impaled through an eye socket 10A of one side of the bait fish 10 and is passed through the opposed eye socket 10A on the other side of the bait fish 10 to extend therefrom. It should be appreciated by those skilled in the art that the eye sockets 10A of the bait fish 10 is surrounded by a skeleton structure. The locking pin 90 impaled through the eye sockets 10A of the bait fish 10 is disposed within this skeleton structure for providing an effective attachment of the improved fishing lure 20 to the bait fish 10. The locking portion 94 is smaller in diameter than the locking pin 90 and approximates a point for the locking pin 90 to facilitate the impaling of the locking pin 90 through the eye socket 10A of the bait fish 10.

FIG. 23 further illustrates selected beads 102 of the bead leader 100 being inserted into the first, second and third depressions 71-73. The interconnecting wires 104 extend through the first and second separating walls 74 and 76 to attach the bead leader 100 relative to the lure insert 22. The first and second separating walls 74 and 76 insure that the position of the bead leader 100 is fixed relative to the lure insert 22. In addition, the proper selection of the beads 102 inserted into the first, second and third depressions 71-73 enables the proper positioning of the fishing hook 14 relative to the lure insert 22 and relative to the bait fish 10. Preferably, the locking pin 90 is located on the second extending wall to position the bill 19 of the bait fish 10 within the insert relief 78 as shown in FIG. 23.

FIG. 24 illustrates a fourth step of securing the improved fishing lure 20 to the bait fish 10. The lure insert 22 is moved into the insert cavity 36. The bill 19 of the bait fish 10 is received within the head relief 46. Since the bill 19 of the bait fish 10 is received within the head relief 46, the degradation of natural bait due to trolling water entering the mouth of the fish commonly referred to as "bait washout" is essentially eliminated. The first head interior surface 31A of the first head sidewall 31 engages the first insert sidewall 61 to retain the selected beads 102 of the bead leader 100 within the first, second and third depressions 71-73. The first panel 40 is deflected outwardly by an operator as indicated by the arrow for enabling the locking portion 94 of the locking pin 90 to be aligned with the locking aperture 42. Upon release of the deflection of the first panel 40 by the operator, the first panel 40 returns to a non-deflected position to receive the locking portion 94 within the locking aperture 42 as shown in FIG. 24. The locking portion 94 disposed within the locking aperture 42 prevents the removal of the lure insert 22 from the lure head 21. The bait fish 10 is retained between the first and second panels 40 and 80.

Figure 25:
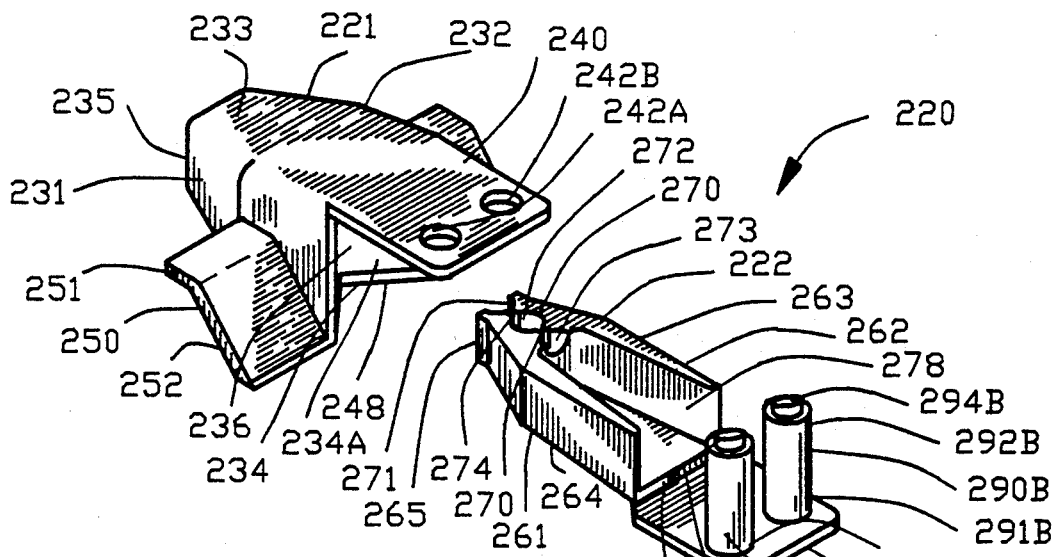
FIG. 25 is an isometric view of a second embodiment of an enhanced fishing lure comprising a lure head and a lure insert incorporating the present invention.
Figures 26, 27:
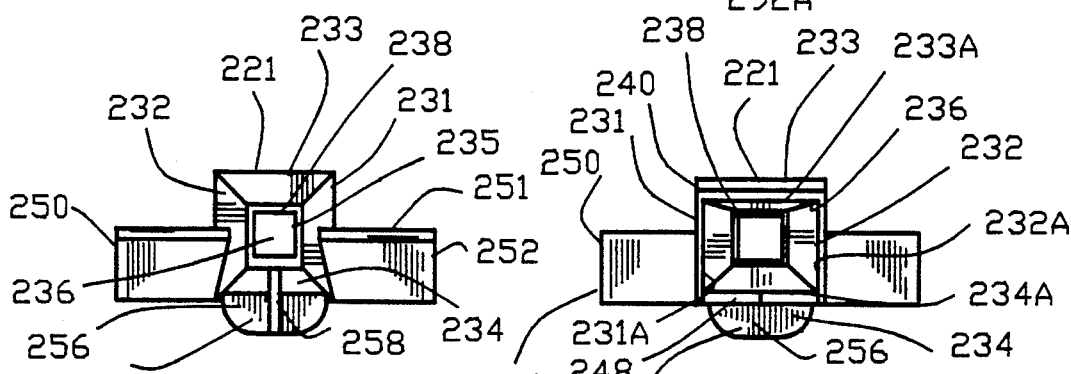
FIG. 26 is a front elevational view of the lure head of FIG. 25.
FIG. 27 is a rear elevational view of the lure head of FIG. 25.
Figures 28, 29:
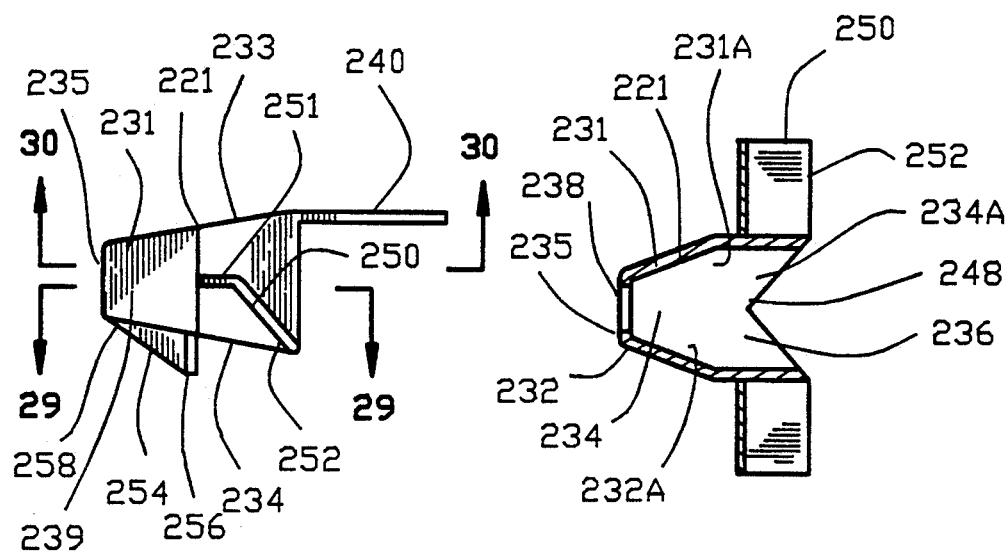
FIG. 28 is a right side elevational view of the lure head of FIG. 26.
FIG. 29 is a sectional view along line 29—29 in FIG. 28.

FIG. 25 is an isometric disassembled view of a second embodiment of an enhanced fishing lure 220 having a lure head 221 and a lure insert 222. FIGS. 26-31 illustrate various views of the lure head 221. The lure head 221 comprises a generally truncated pyramidal shape defined by a first and a second head sidewall 231 and 232 and a top head wall 233 and a bottom head wall 234. The generally truncated pyramidal shape provides a tapered front portion terminating in a front surface 235 for facilitating the movement of the improved fish lure 220 through the water. The first and second head sidewalls 231 and 232 and the top and bottom head walls 233 and 234 have first and second head interior surfaces 231A and 232A and top and bottom head interior surfaces 233A and 234A defining an insert cavity 236 within the lure head 221. A front aperture 238 in the lure head 221 communicates with the insert cavity 236. Optional eye indicia shown as eye 239 may be disposed on the first and second head sidewalls 232 for simulating eyes of the enhanced fishing lure 220.

The top wall 233 includes a rearwardly extending first panel 240 having a first and a second locking aperture 242A and 242B defined therein. As best shown in FIG. 31, the top wall 233 is substantially thicker than the bottom wall 234 and the first and second sidewalls 231 and 232. A generally V-shaped cut-out 248 is defined in the bottom wall 232.

Preferably, the lure head 221 includes a stabilizing fin 250 having a front fin portion 251 and a rear fin portion 252. The front fin portion 251 is established to be substantially horizontal to the direction of movement of the lure head 221 when the lure head 221 is pulled through the water. The rear fin portion 252 is angled downwardly for providing stabilizing to the improved fishing lure 220 during trolling.

An action plate 254 comprises an arcuate depending plate 256 integrally secured to the lure head 221 and extending from the bottom surface 234 generally parallel to the front surface 235. A support 258 is secured to the lure head 221 and extends from the bottom surface 234 generally perpendicularly to the arcuate depending plate 256. The support 258 is secured to the arcuate depending plate 256 to add mechanical strength thereto. The action plate 256 causes a jumping action to the lure head 221 when the enhanced fishing lure 220 is retrieved by a fisherman. In addition, the action plate 256 provides an enhanced acoustical output of the enhanced fishing lure 220. The support 258 enables the enhanced fishing lure 220 to be skipped over weed beads.

FIGS. 32-36 illustrate various views of the lure insert 222 of FIG. 25. The lure insert 222 comprises a partially pyramidal shaped insert portion 260 having a first and a second insert sidewall 261 and 262 and a top insert wall 263 and a bottom insert wall 264. The first and second insert sidewall 262 and the top and bottom insert walls 263 and 264 are established at an angle for closely engaging the first and second head interior surfaces 231A and 232A and the top and bottom interior surfaces 233A and 234A, respectively, of the lure head 221 when the lure insert 222 is fully disposed within the insert cavity 236.

The top insert wall 263 includes an insert slot 270 extending from a front insert wall 265 of the lure insert 222 to an insert relief 278 defined in the top wall 263. A plurality of depressions including a first, second and a third depression 271-273 are intermittently defined in the top insert wall 263 with a first separating wall 274 interposed between the first and the second depressions 271 and 272 and with a second separating wall 276 interposed between the second and the third depressions 272 and 273. The first, second and the third depressions 271-273 and the first and second separating walls 274 and 276 comprise a restraining means for restraining the movement of a leader relative to the enhanced fishing lure 220 as will be described in greater detail hereinafter.

The bottom insert wall 264 comprises a second panel 280 having a generally V-shaped projection 282 for matingly engaging with the V-shaped cut-out 248 of the bottom head wall 234 when the lure insert 222 is disposed within the lure head 221. A first and a second locking pin 290A and 290B have proximal ends 291A and 291B thereof secured to the second panel 280. A first and a second distal end 292A and 292B of the first and second locking pins 290A and 290B include locking portions 294A and 294B having a reduced diameter for insertion within the first and second locking apertures 242A and 242B of the first panel 240 when the lure insert 222 is disposed within the lure head 221.

Preferably, the lure head 221 and the lure insert 222 are each formed as a unitary member of a molded polymeric material. The first and second panels 240 and 280 are slightly flexible and resilient for enabling the locking portions 294A and 294B to be inserted and removed from the locking apertures 242A and 242B by deflecting either the first and/or the second panels 240 and 280.

Figure 37:
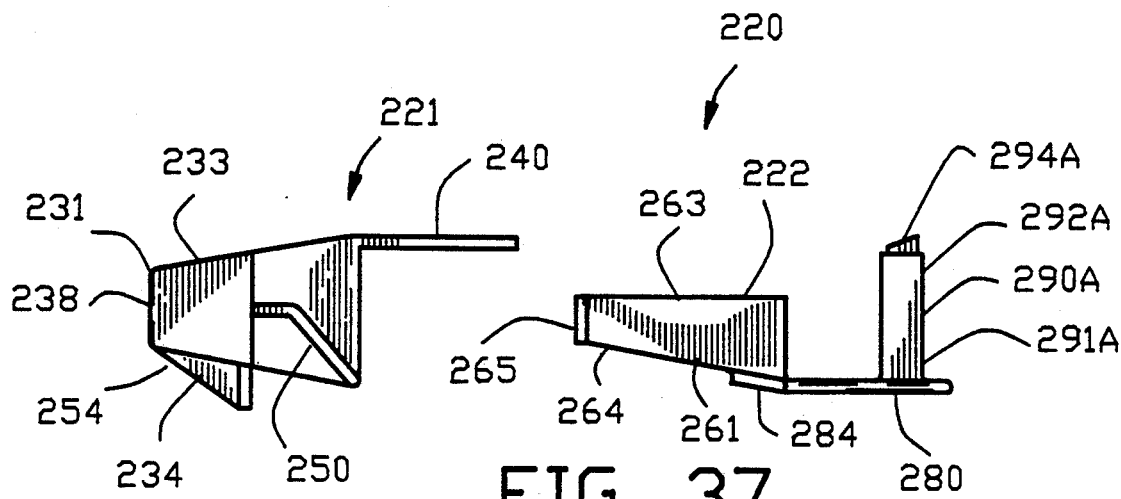
FIG. 37 is a side elevational of the enhanced fishing lure of FIG. 25 in an unassembled condition.
Figure 38:
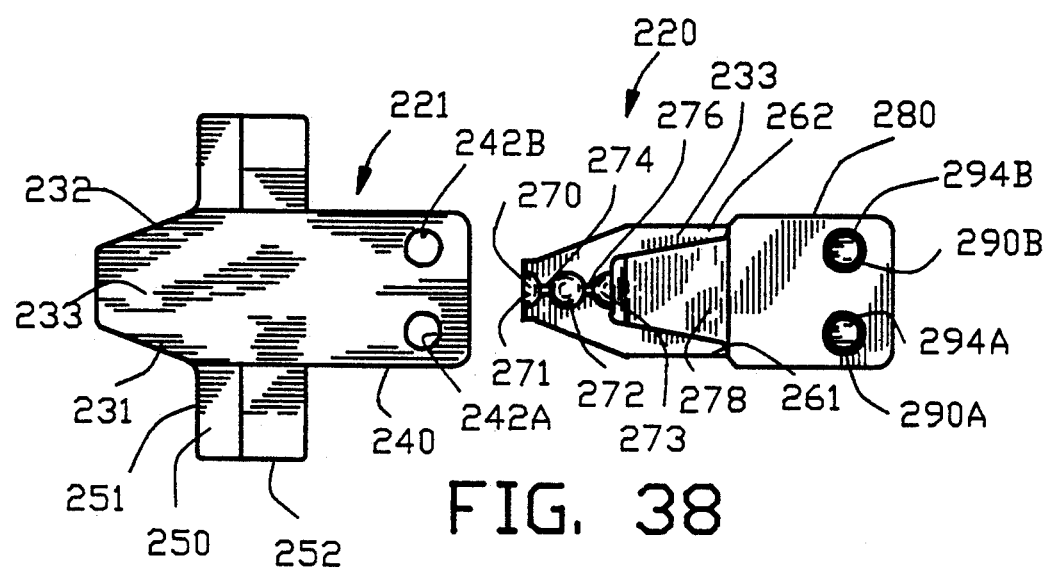
FIG. 38 is a top view of FIG. 37.

FIG. 37 is a side view of the lure head 221 and the lure insert 222 being in an unassembled position. FIG. 38 is a top view of FIG. 37 illustrating the relative positions of the first and second panels 240 and 280 and the locking pins 290A and 290B.

Figure 39:
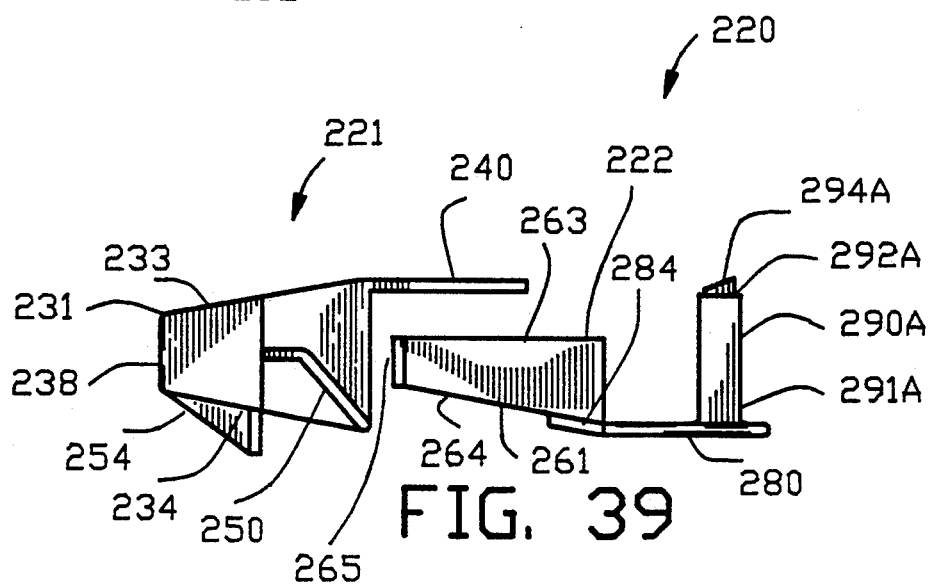
FIG. 39 is a side elevational view of the enhanced fishing lure of FIG. 25 in a partially assembled condition.
Figure 40:
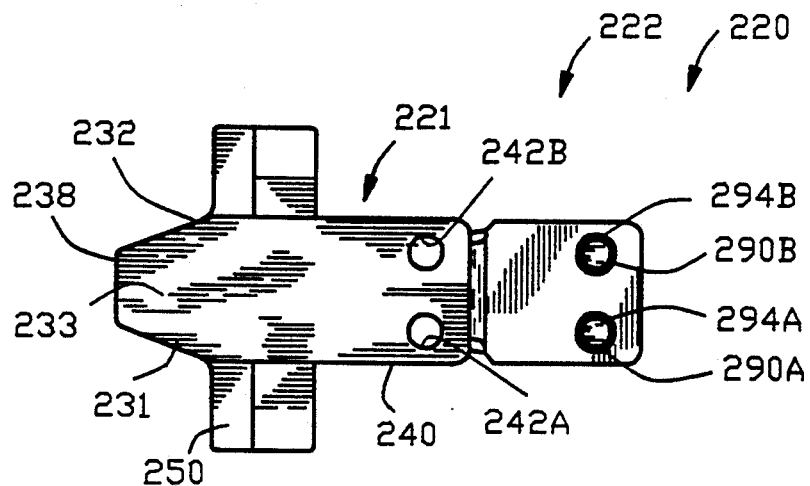
FIG. 40 is a top view of FIG. 39.

FIG. 39 is a side view similar to FIG. 37 illustrating the lure insert 222 being partially disposed within the internal cavity of the lure head 221. FIG. 40 is a top view of FIG. 39. The insert portion 260 of the lure insert 222 is slidably received within the insert cavity 236 of the lure head 221.

Figures 41, 42:
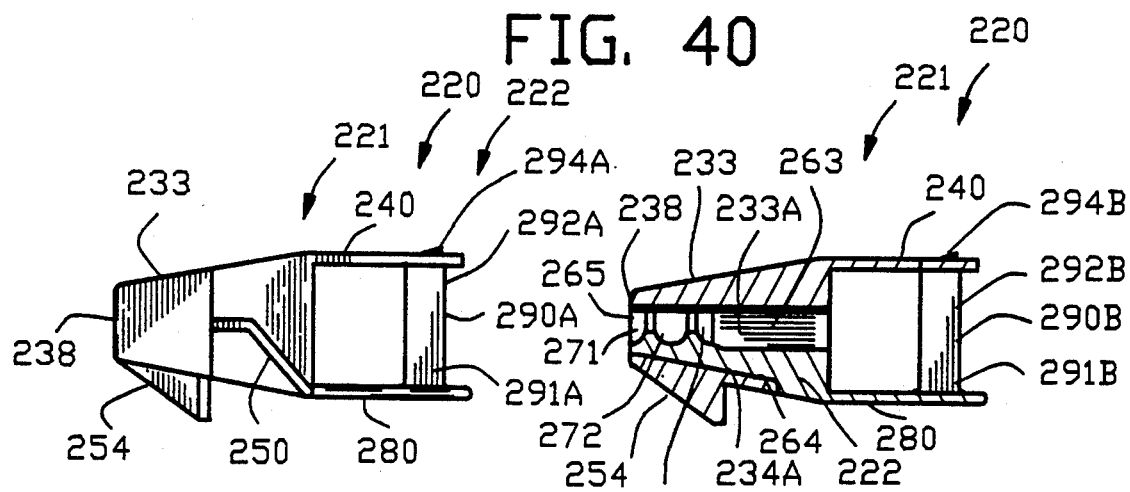
FIG. 41 is a side elevational view of the enhanced fishing lure of FIG. 25 in an assembled condition.
FIG. 42 is a top view of FIG. 41.
Figure 43:
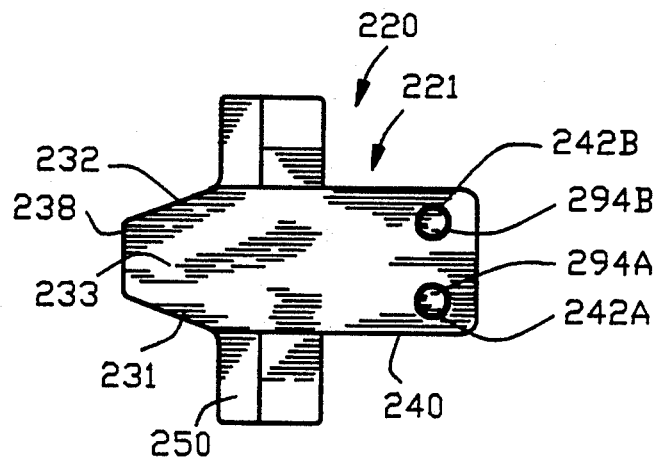
FIG. 43 is a sectional view along line 43—43 in FIG. 42.

FIG. 41 is a side view similar to FIG. 37 illustrating the complete insertion of the lure insert 222 within the lure head 221 and with the lock portion of the locking pins 290A and 290B being received within the locking apertures 242A and 242B of the first panel 240. FIG. 43 is a top view of FIG. 41. Engagement of the locking portions 294A and 294B within the locking apertures 242A and 242B of the first panel 240 interlocks the lure insert 222 within the lure head 221. It should be appreciated by those skilled in the art that the insertion of the locking portions 294A and 294B within the locking apertures 242A and 242B of the first panel 240 has been accomplished by either an upward deflection of the first panel 240 and/or a downward deflection of the second panel 280 in FIG. 39. The first panel 240 and/or second panel 280 is made of a resilient material for enabling the upward deflection of the first panel 240 and/or a downward deflection of the second panel 280.

FIG. 42 is a sectional view illustrating the complete insertion of the lure insert 222 within the lure head 221 and with the lock portion of the locking pins 290A and 290B being received within the locking apertures 242A and 242B of the first panel 240. The relative position of the top surface 263 of the lure insert 222 relative to the top interior surface 233A encloses the first, second and third depressions 271-273. The enclosure of the first, second and third depressions 271-273 entraps beads 302 of a beaded leader 300 as will be described with reference to FIGS. 44-47. The entrapped beads 302 of the beaded leader 300 within the first, second and third depressions 271-273 restrain and restrict the movement of said bead leader 300 relative to said slot 270 and the lure insert 222.

Figure 44:
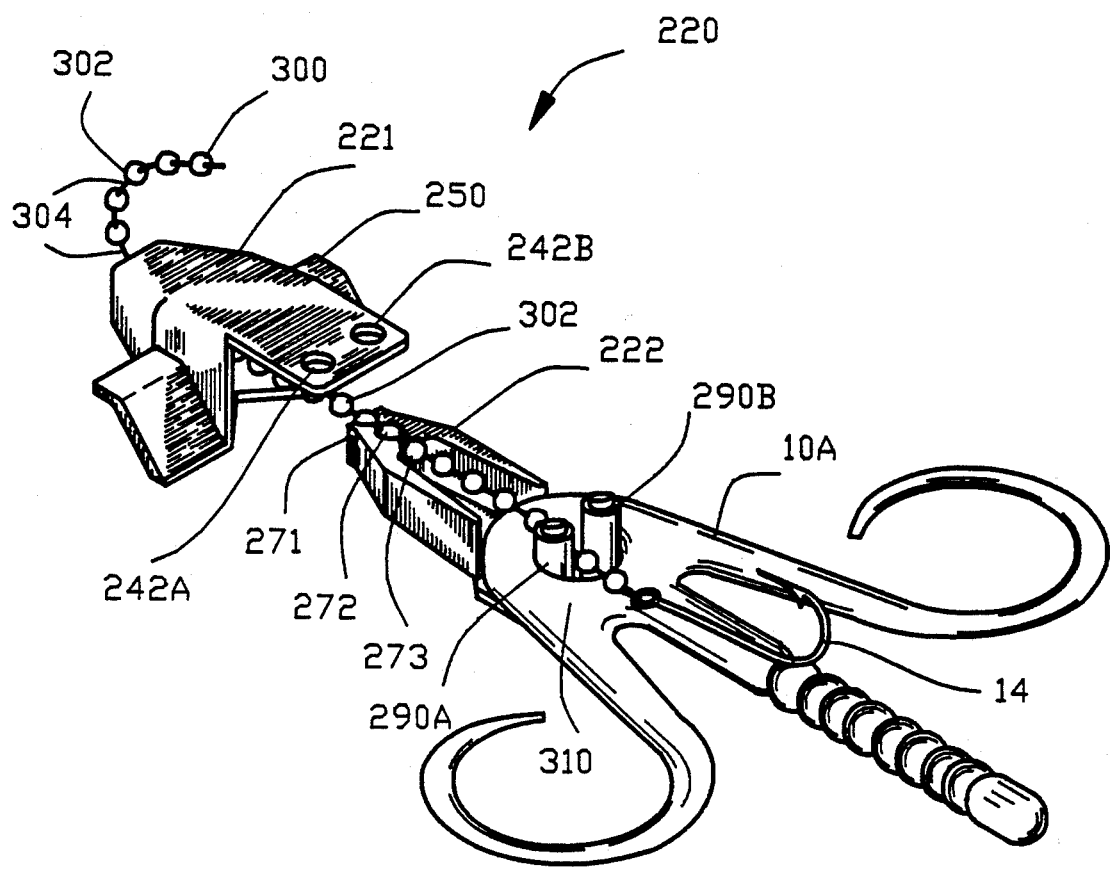
FIG. 44 is an exploded isometric view of the enhanced fishing lure of FIG. 25 with an artificial bait and a fishing hook positioned in a first manner.

FIG. 44 is an isometric view of the second embodiment of the enhanced fishing lure 220 with an artificial bait 10A secured thereto. The bead leader 300 is of conventional design having a plurality of beads 302 interconnected by a plurality of interconnecting wires 304 for attaching to a fishing hook 14. The fishing hook 14 may be freely positioned adjacent the artificial bait 10A. In the alternative, the fishing hook 14 may be partially or totally positioned within the artificial bait 10A as should be well known to those skilled in the art.

The locking pins 290A and 290B are inserted through or impaled through an aperture 310 in the artificial bait 10A to extend therefrom. The locking portions 294A and 294B are smaller in diameter than the locking pins 290A and 290B and approximates a point for the locking pin 290A and 290B to facilitate the inserting or impaling of the locking pins 290A and 290B through the aperture 310 of the artificial bait 10A.

When the fishing hook is properly positioned relative to the artificial bait 10A, the beaded leader 300 is passed between the locking pins 290A and 290B. Selected beads 302 of the bead leader 300 are inserted into the first, second and third depressions 271-273. The interconnecting wires 304 extend through the first and second separating walls 274 and 276 to attach the bead leader 300 relative to the lure insert 222. The first and second separating walls 274 and 276 insure that the position of the bead leader 300 is fixed relative to the lure insert 222. In addition, the proper selection of the beads 302 inserted into the first, second and third depressions 271-273 enables the proper positioning of the fishing hook 14 relative to the lure insert 222 and relative to the artificial bait 10A. The locking pins 290A and 290B assist in positioning the fishing hook 14 relative to the enhanced fishing lure 220.

Figure 45:
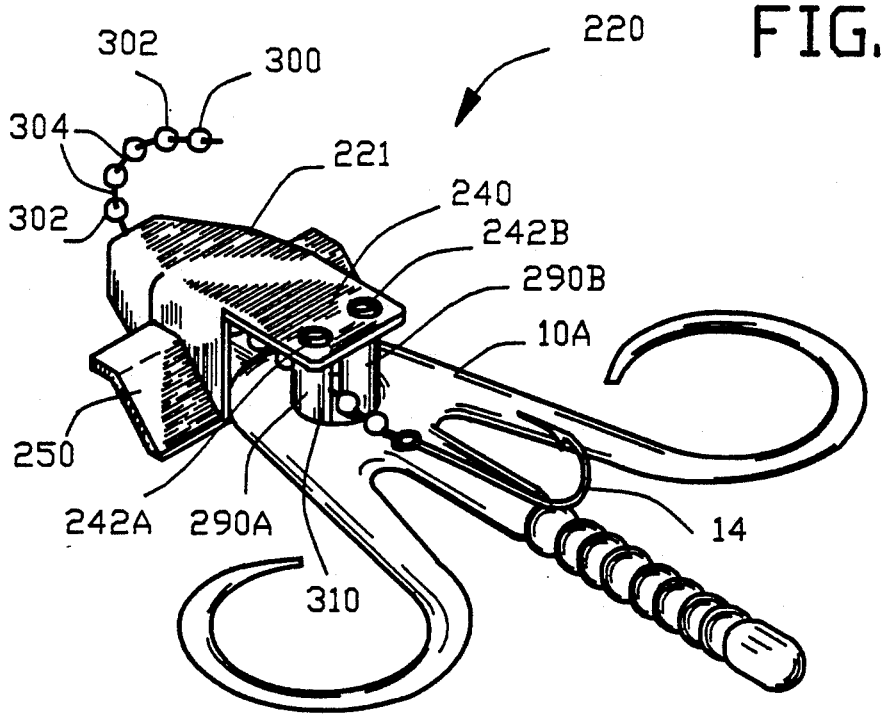
FIG. 45 is an assembled isometric view of the enhanced fishing lure of FIG. 44.

When the lure insert 222 is moved into the insert cavity 236, the top insert wall 263 of the of the insert 222 engages the top head interior wall 233A of the lure head to retain the selected beads 302 of the bead leader 300 within the first, second and third depressions 271-273. The first panel 240 is deflected upwardly by an operator for enabling the locking portions 294A and 295B of the locking pins 290A and 290B to be aligned with the locking apertures 242A and 242B. In the alternative, the second panel 280 may be deflected downwardly by an operator for enabling the locking portions 294A and 295B of the locking pins 290A and 290B to be aligned with the locking apertures 242A and 242B. Upon release of the deflection of the first panel 240 and or second panel 280 by the operator, the first panel 240 and/or second panel 280 returns to a non-deflected position to receive the locking portions 294A and 290B within the locking apertures 242A and 242B as shown in FIG. 45. The locking portions 294A and 294B disposed within the locking apertures 242A and 242B prevents the removal of the lure insert 222 from the lure head 221. The artificial bait 10A is retained between the first and second panels 240 and 280.

Figure 46:
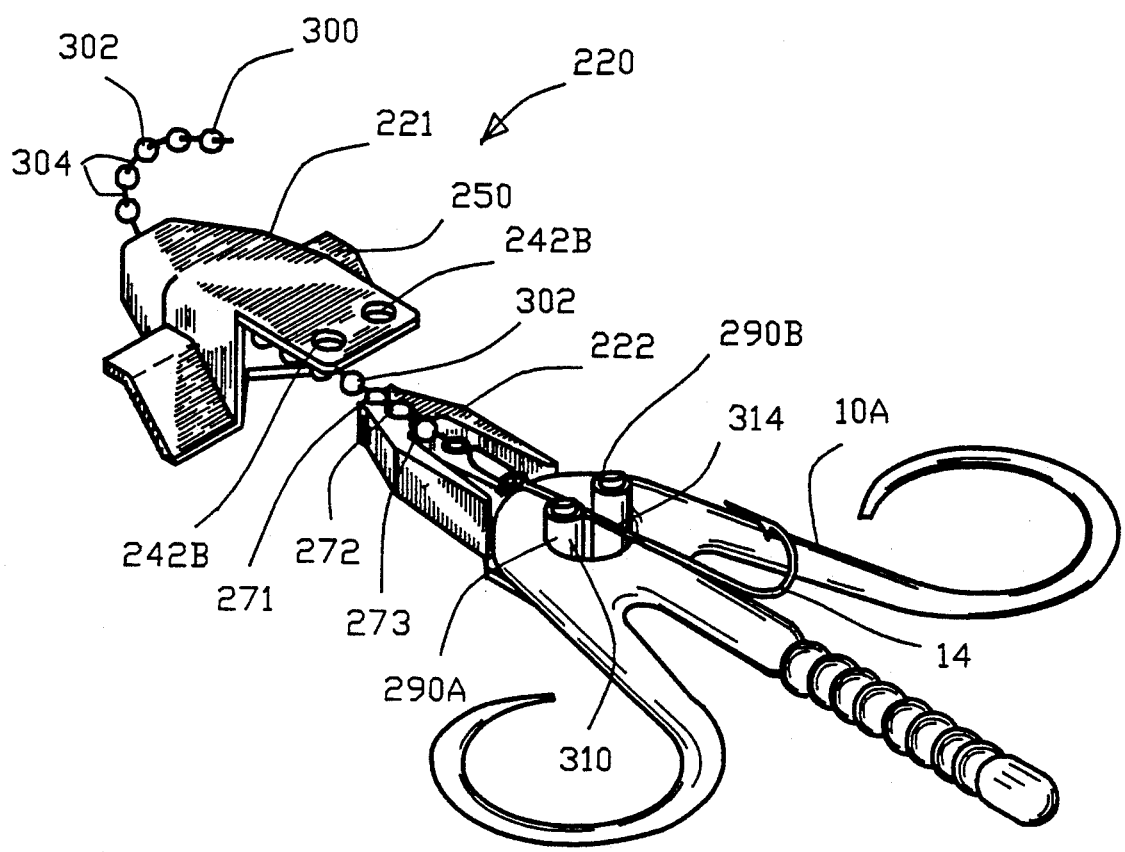
FIG. 46 is an exploded isometric view of the enhanced fishing lure of FIG. 25 with an artificial bait and a fishing hook positioned in a second manner.

FIG. 46 is an isometric view of the second embodiment of the enhanced fishing lure 220 with an artificial bait 10A secured thereto. In this example, the bead leader 300 includes a conventional snap latch 312 for attaching the fishing hook 14 to the beaded leader 300. The snap 312 is located within the insert relief 278 of the lure insert 222. The shank 314 of the fishing hook 14 may be disposed between the locking pins 290A and 290B to assist in positioning the fishing hook 14 relative to the enhanced fishing lure 220.

Figure 47:
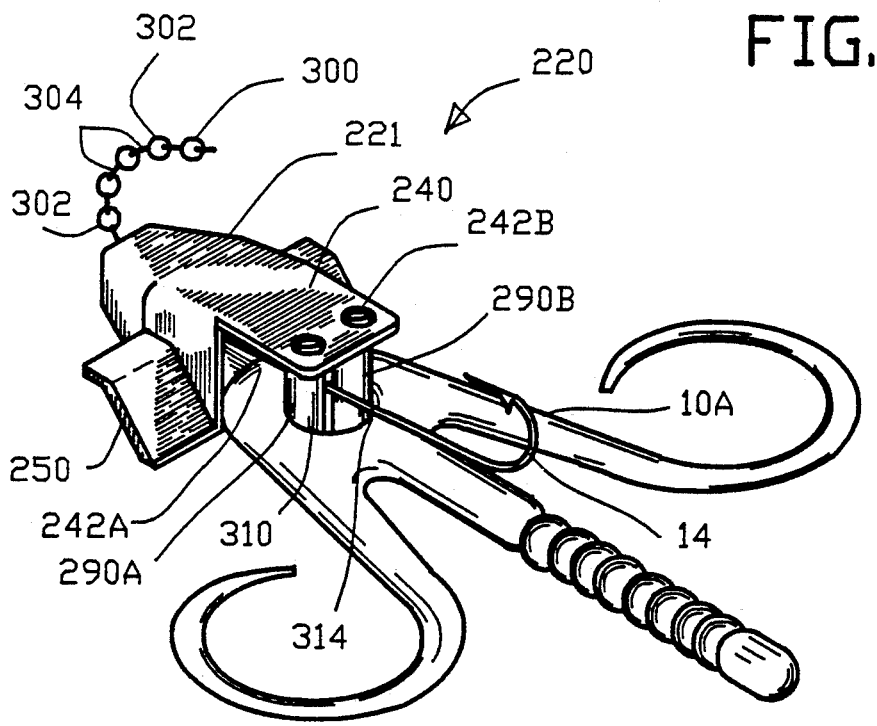
FIG. 47 is an assembled isometric view of the enhanced fishing lure of FIG. 46.

When the fishing hook is properly positioned relative to the artificial bait 10A, the selected beads 302 of the bead leader 300 are inserted into the first, second and third depressions 271-273. When the lure insert 222 is moved into the insert cavity 236, the locking portions 294A and 294B are disposed within the locking apertures 242A and 242B prevents the removal of the lure insert 222 from the lure head 221 as shown in FIG. 47. The shank 314 of the hook 14 extending between the locking pins 290A and 290B inhibits the movement of the hook 14 and properly positions the fishing hook 14 relative to the artificial bait 10A.

The present invention provides an improved fishing lure for attaching a bait to a fishing line that overcomes the difficulties encountered by the prior art. The improved fishing lure may be used with natural bait with the locking pin extending through the eye sockets of a bait fish or may be used with artificial bait with the locking pin extending through a hole in the artificial bait.

The enhanced fishing lure permits the rapid addition of bait or the rapid removal of artificial bait from the fishing lure and permits the adjustment of the position of the hook relative to the bait. Stabilizing fins may be utilized for stabilizing the movement of the fishing lure through the water without undesirable spinning. The action plate causes a jumping action to the lure head when the enhanced fishing lure is retrieved by a fisherman and provides an enhanced acoustical output. The support enables the enhanced fishing lure to be skipped over weed beads.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An enhanced fishing lure for attaching a bait to a fishing line, comprising in combination:

a lure head having a front aperture for enabling the fishing line to extend therethrough;

said lure head having an insert cavity communicating with said front aperture;

a lure insert comprising an insert portion;

a first and a second panel extending from said lure head and said lure insert;

a first and a second locking pin means secured to one of said first and second panels for cooperating with locking aperture means defined in the other of said first and second panels;

restraining means secured to said lure insert for restraining the movement of the fishing line relative thereto;

said first and second locking pin means extending through the bait for restraining the movement of the bait relative thereto; and said lure insert being insertable within said insert cavity of said lure head with the fishing line extending between said first and second locking pin means and through said front aperture of said lure head and with said locking aperture means cooperating with said first and second locking pin means for interlocking said lure insert to said lure head.

2. An enhanced fishing lure as set forth in claim 1, wherein said first and second locking pin means extend through the bait and being partially received within said locking aperture means for restraining the movement of the bait relative thereto; and at least one of said first and second panels being resilient for enabling the introduction and removal of said first and second locking pin means within said locking aperture means to permit the addition and removal of the bait from the fishing lure.

3. An enhanced fishing lure as set forth in claim 1, wherein said insert cavity is defined for slidably receiving said insert portion of said lure insert therein.

4. An enhanced fishing lure as set forth in claim 1, wherein said first panel extends from a first side surface of said lure head; and said second panel being aligned with a second side surface of said lure head.

5. An enhanced fishing lure as set forth in claim 1, wherein said first panel extends from one of said top and bottom of said lure head; and said second panel being aligned with the other said top and bottom of said lure head.

6. An enhanced fishing lure as set forth in claim 1, including at least one of said lure head and said lure insert defining a relief for receiving a head portion of the bait.

7. An enhanced fishing lure as set forth in claim 1, including at least one of said lure head and said lure insert defining a relief for receiving a snap for affixing a fishing hook to the fishing line.

8. An enhanced fishing lure as set forth in claim 1, wherein said restraining means comprises means for adjusting the position of a hook disposed at a termination end of the fishing line relative to the bait.

9. An enhanced fishing lure as set forth in claim 1, wherein said restraining means includes a slot extending through said lure insert for enabling the fishing line to extend therethrough; and means for restricting the movement of the fishing line relative to said slot.

10. An enhanced fishing lure as set forth in claim 1, wherein the fishing line includes a bead leader comprising a plurality of beads interconnected by a plurality of interconnecting wires;

said restraining means includes a slot extending through said lure insert for enabling the interconnecting wires to extend therethrough; and a plurality of depressions defined in said lure insert along said slot for receiving said plurality of beads therein to restrict the movement of said bead leader relative to said slot.

11. An enhanced fishing lure for attaching a bait to a fishing line, comprising in combination:

a lure head having a front aperture for enabling the fishing line to extend therethrough;

said lure head having an insert cavity communicating with said front aperture;

said lure head having a first panel extending rearwardly of said lure head with said first panel defining locking aperture means;

a lure insert comprising an insert portion and a second panel extending rearwardly of said insert portion with said second panel supporting a first and a second locking pin means;

restraining means secured to said lure insert for restraining the movement of the fishing line relative thereto;

said first and second locking pin means extending through the bait for restraining the movement of the bait relative thereto; and said lure insert being insertable within said insert cavity of said lure head with the fishing line extending between said first and second locking pin means and through said front aperture of said lure head and with said locking aperture means of said first panel cooperating with said first and second locking pin means of said second panel for interlocking said lure insert to said lure head and for retaining the bait between said first and second panels.

12. An enhanced fishing lure as set forth in claim 11, including fin means extending from said lure head for stabilizing the movement of the fish lure through the water.

13. An enhanced fishing lure as set forth in claim 11, wherein said lure head comprises a tapered front portion disposed about said front aperture for facilitating the movement of the fishing lure through the water.

14. An enhanced fishing lure as set forth in claim 11, wherein said insert cavity is defined for slidably receiving said insert portion of said lure insert therein.

15. An enhanced fishing lure as set forth in claim 11, wherein said first panel extends from a first side surface of said lure head; and said second panel being aligned with a second side surface of said lure head.

16. An enhanced fishing lure as set forth in claim 11, wherein said first panel extends from one of said top and bottom of said lure head; and said second panel being aligned with the other said top and bottom of said lure head.

17. An enhanced fishing lure as set forth in claim 11, including at least one of said lure head and said lure insert defining a relief for receiving a head portion of the bait.

18. An enhanced fishing lure as set forth in claim 11, including at least one of said lure head and said lure insert defining a relief for receiving a snap for affixing a fishing hook to the fishing line.

19. An enhanced fishing lure as set forth in claim 11, wherein said restraining means comprises means for adjusting the position of a hook disposed at a termination end of the fishing line relative to the bait.

20. An enhanced fishing lure as set forth in claim 11, wherein said restraining means includes a slot extending through said lure insert for enabling the fishing line to extend therethrough; and means for restricting the movement of the fishing line relative to said slot.

21. An enhanced fishing lure as set forth in claim 11, wherein the fishing line includes a bead leader comprising a plurality of beads interconnected by a plurality of interconnecting wires;

said restraining means includes a slot extending through said lure insert for enabling the interconnecting wires to extend therethrough; and a plurality of depressions defined in said lure insert along said slot for receiving said plurality of beads therein to restrict the movement of said bead leader relative to said slot.

22. An enhanced fishing lure as set forth in claim 11, wherein said first panel extends from a first side surface of said lure head;

said second panel being aligned with a second side surface of said lure head; and said first and second locking pin means extending from said second panel through the bait and being partially received within said locking aperture means for restraining the movement of the bait relative thereto.

23. An enhanced fishing lure as set forth in claim 11, wherein said first panel extends from a one of the top and bottom walls of said lure head;

said second panel being aligned with the other of the top and bottom walls of said lure head; and said first and second locking pin means extending from said second panel through the bait and being partially received within said locking aperture means for restraining the movement of the bait relative thereto.

24. An enhanced fishing lure as set forth in claim 11, wherein said first panel extends from a first side surface of said lure head;

said second panel being aligned with a second side surface of said lure head; and said first and second locking pin means extending from said second panel through an eye socket of a natural bait and being partially received within said locking aperture means for restraining the movement of the bait relative thereto.

25. An enhanced fishing lure as set forth in claim 11, wherein said first panel extends from a one of the top and bottom wall of said lure head;

said second panel being aligned with the other of said top and bottom walls of said lure head; and said first and second locking pin means extending from said second panel through an orifice of an artificial bait and being partially received within said locking aperture means for restraining the movement of the bait relative thereto.

26. An enhanced fishing lure as set forth in claim 11, wherein said first panel extends from a first side surface of said lure head;

said second panel being aligned with a second side surface of said lure head; and said first and second locking pin means extending from said second panel through an orifice in an artificial bait and being partially received within said locking aperture means for restraining the movement of the bait relative thereto.

27. An enhanced fishing lure as set forth in claim 11, wherein said first panel extends from a first side surface of said lure head;

said second panel being aligned with a second side surface of said lure head;

said first and second locking pin means extending from said second panel through the bait and being partially received within said locking aperture means for restraining the movement of the bait relative thereto; and said first and second panels being resilient for enabling the introduction and removal of said first and second locking pin means within said locking aperture means to permit the addition and removal of the bait from the fishing lure.

28. An enhanced fishing lure as set forth in claim 11, including an action plate extending from the lure head for enabling the fishing lure to be skipped over weed beads.

* * * * *